United States Patent [19]

Pearson et al.

[11] Patent Number: 4,782,922

[45] Date of Patent: Nov. 8, 1988

[54] BRAKE DEVICE

[75] Inventors: Barry Pearson; Clive A. Barker, both of Bedford, England

[73] Assignee: Ti Interlock Limited, Bedford, England

[21] Appl. No.: 900,554

[22] Filed: Aug. 26, 1986

[30] Foreign Application Priority Data

Aug. 30, 1985 [GB] United Kingdom ............... 8521630

[51] Int. Cl.$^4$ .................... F16D 55/00; F16D 55/02; F16D 65/09; B60T 11/00
[52] U.S. Cl. ................................. 188/71.1; 188/71.6; 188/73.34; 188/367
[58] Field of Search ................... 188/71.1, 71.4, 71.6, 188/72.4, 72.5, 73.31, 73.32, 73.33, 73.34, 218 XL, 366, 367, 368, 369, 370; D12/180; 192/66, 67 A, 85 AA, 87.16, 112, 70.13; 74/606 R, 606 A, 612; 220/259, 263, 283, 334; 16/223, 250, 279; 49/371-373

[56] References Cited

U.S. PATENT DOCUMENTS

| | | | |
|---|---|---|---|
| 2,575,578 | 11/1951 | Bricker | 188/73.31 X |
| 3,310,698 | 3/1967 | Krell | 74/606 X |
| 3,323,625 | 6/1967 | Webster | 192/112 |
| 3,602,328 | 8/1971 | Fannin et al. | 188/72.5 |
| 3,610,380 | 10/1971 | Montalvo | 188/73.34 X |
| 3,637,053 | 1/1972 | Boyles | 188/71.1 |
| 3,661,235 | 5/1972 | Harrison | 188/218 X |
| 3,899,054 | 8/1975 | Huntress et al. | 188/218 X |
| 3,955,650 | 5/1976 | Ellis | 188/73.3 |
| 4,171,038 | 10/1979 | Sommer | 192/85 AA X |
| 4,235,315 | 11/1980 | Schlamann et al. | 188/73.6 |
| 4,245,722 | 1/1981 | Schlamann et al. | 188/71.4 |
| 4,473,137 | 9/1984 | Gerard et al. | 188/73.32 |
| 4,566,351 | 1/1986 | Skipor | 220/259 X |
| 4,666,025 | 5/1987 | Rubin | 188/370 X |

FOREIGN PATENT DOCUMENTS

| | | | |
|---|---|---|---|
| 2326992 | 12/1973 | Fed. Rep. of Germany | 188/73.32 |
| 1090611 | 4/1955 | France | 188/370 |
| 2398930 | 7/1977 | France . | |
| 2436287 | 9/1979 | France . | |
| 0366695 | 11/1970 | Japan | 188/73.32 |
| 1189575 | 4/1970 | United Kingdom | 188/71.1 |
| 2100814 | 1/1983 | United Kingdom . | |

Primary Examiner—Duane A. Reger
Assistant Examiner—Robert J. Oberleitner
Attorney, Agent, or Firm—Seidel, Gonda, Lavorgna & Monaco

[57] ABSTRACT

A brake for a braking shaft has a housing containing a brake disc (20) carried by the shaft and brake assemblies comprising fluid operated actuators (31) for brake pads (30) engageable with one side of the brake disc. The actuators are mounted on a cover portion (2) which can be hinged down to facilitate servicing of the brake assemblies. The cover portion has integrally formed locating elements for the actuators and guides for the brake pads (40,41,42,44). The brake disc (20) can slide off the shaft to allow access to passive brake pads acting on the other side of the brake disc.

18 Claims, 6 Drawing Sheets

BRAKE DEVICE

FIELD OF THE INVENTION

The invention relates to a brake device in which a brake disc carried by a shaft to be braked is selectively engaged by braking pads of friction material when braking is required.

BACKGROUND OF THE INVENTION

In brake devices of this kind, particularly where there were provided a plurality of separate braking pads each movable to frictionally engage the brake disc by a respective actuator, servicing of the device for example to replace worn braking pads takes a considerable time, and during this time the apparatus of which the brake device forms a part is out of use.

It is therefore an object of the present invention to provide a brake device of the kind mentioned in which access to the braking pads and the associated actuators is facilitated.

It is also an object of the invention to provide a braking device in which selectively movable braking assemblies are mounted together on a single support which can be readily moved between operative and servicing positions.

It is a further object of the invention to provide a device for retarding a shaft in which brake elements are confined within a housing into which an end of the shaft extends.

It is also an object of the invention to provide a housing for a brake device a cover portion of which can be opened to provide ready access to serviceable parts of the device.

It is also an object of the invention to provide a housing for a brake device having efficient cooling air flow arrangements.

It is also an object of the invention to provide a housing for a brake device provided with integrally formed supports for the working parts of the device.

SUMMARY OF THE INVENTION

The invention provides a brake device having a housing containing a brake disc on a shaft to be braked, and one or more braking assemblies having braking elements or pads selectively movable into frictional engagement with the brake disc, the or each braking assembly being mounted on a housing portion which is mounted for pivotation on an axis, which is preferably transverse to the shaft, between operative and servicing positions.

The housing portion can thus be pivoted for example downwardly on about a generally horizontal axis, for example an axis below and perpendicular to a generally horizontal shaft axis, to expose for servicing the brake pads and the actuators which drive them. The support can comprise a lid or cover portion of the housing pivoted for movement relative to the rest of the housing through an appropriate angle say 90 or 180 and the pivot arrangement can be such as to facilitate separation of the support from the device. The lid or cover can be square or rectangular with a hinge connection along one side and fastening means at the other in the form for example of a fastening clamp or bolt, which may be associated with a locating means, at each corner.

The brake disc is preferably backed by a further braking pad or pads, which may be passive or movable to apply a positive braking force, and which are preferably disposed directly opposite the first-mentioned braking pads. To facilitate servicing of these, the invention can provide that the brake disc is readily removable from its shaft for example by being slidably received thereon by way of co-operating interior and exterior splines.

A brake device according to the invention can thus comprise a first and second braking means mounted on opposed sides of a brake disc, the means mounting the first braking means being readily movable, as by a hinge connection, to allow access to them and the brake disc being readily removable from the shaft to allow access to the second braking means.

The housing is preferably apertured to allow a cooling air flow therethrough, and may have side walls with a wire mesh guard screen or a pressed metal screen formed with lips at its ends by which it can be slidingly received on ridges formed on corner pillars of the housing. The air flow is preferably induced by an impeller means and this can conveniently be constituted by the brake disc itself.

The or each active braking means of the device can conveniently comprise a ring of separate braking pad and fluid pressure operated actuator assemblies. The invention also provides a brake device having a brake disc and one or more fluid operated actuators for brake elements, in which a support mounting the assembly or assemblies has integrally formed locating means for the actuator and/or guide means for the braking elements. Such guided means can comprise replaceable slide inserts to limit wear.

Fluid pressure is supplied to the actuators through selector valves of which the valve housings can conveniently be constituted by integrally cast portions of the housing.

The brake device 1 of FIGS. 1–6 comprises a housing having front and rear portions 2 and 4 formed as aluminium castings. The rear casting 4 has the form of a generally square open-topped box, of which the apertured base wall is connected in use to an apparatus of which a rotary shaft is to be braked. The sides are constituted by corner posts joined by louvres 5 spaced so as not to unduly obstruct airflow.

Figures 1, 2:
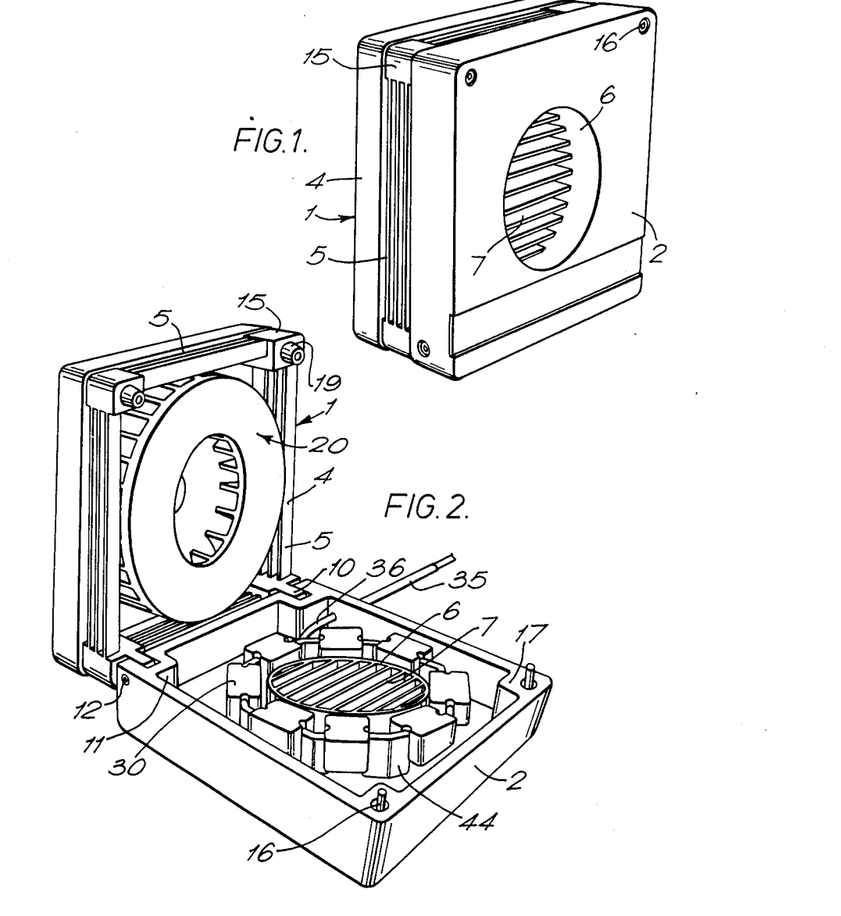
FIGS. 1 and 2 are perspective views of a first illustrative brake device embodying the invention, shown respectively in a closed and an opened position.

The front casting 2 is also generally of the form of a square open-topped box, of which the sides are solid, whilst the base wall, which forms the front of the housing has an inwardly protruding sleeve portion 6 across which extend guard ribs 7, again shaped so as not to unduly obstruct airflow.

The lower corner posts of the rear casting 4 have forwardly protruding lugs 10 received in slots in the corresponding corner posts 11 of the casting 2 through which extend pivot bolts 12 on which the front casting can pivot through about 90° between the closed position of FIG. 1 and the open position of FIG. 2.

The bolts 12 are preferably readily withdrawable to allow separation of the two castings.

The upper corner posts 15 of the rear casting 4 have recesses for receiving fixing bolts 16 extending through holes in the corresponding corner posts 17 of the front casting 2. Locating cones 19 on the corner posts 15 are receivable in the holes in the corner posts 17 to assist alignment of the two housing portions as the casting 4 is pivoted upwardly to the closed position in which they are secured together by turning the ends of the bolts 16 accessible from the front of the housing.

A brake disc 20 within the housing is slidably received on the shaft to be braked.

Figures 3, 4, 5:
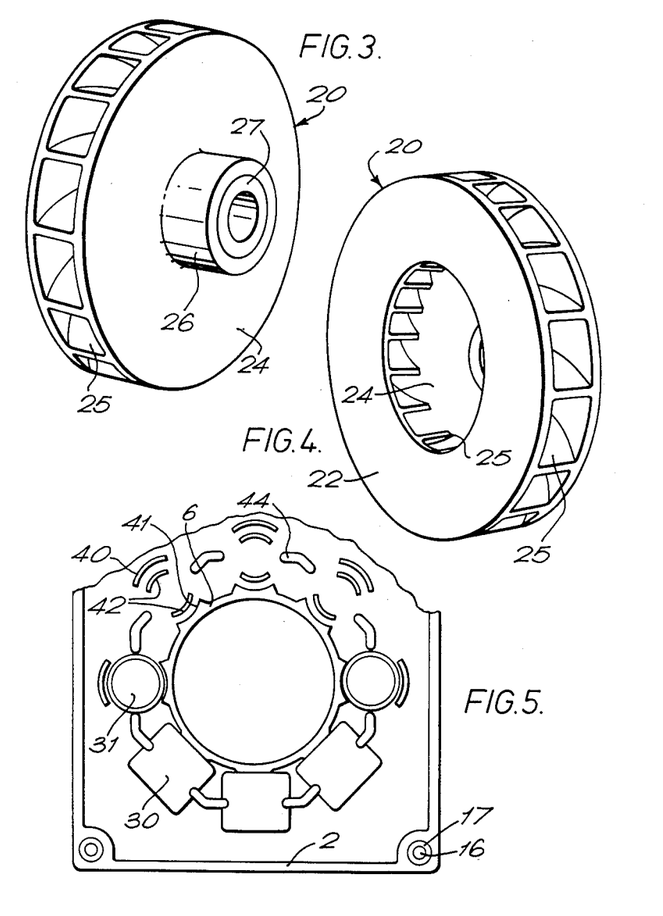
FIGS. 3 and 4 are perspective rear and front views respectively of a brake disc incorporated in the brake device of FIGS. 1 and 2.
FIG. 5 is a partial plan view of a front housing portion of the brake device of FIGS. 1 and 2.
Figure 6:
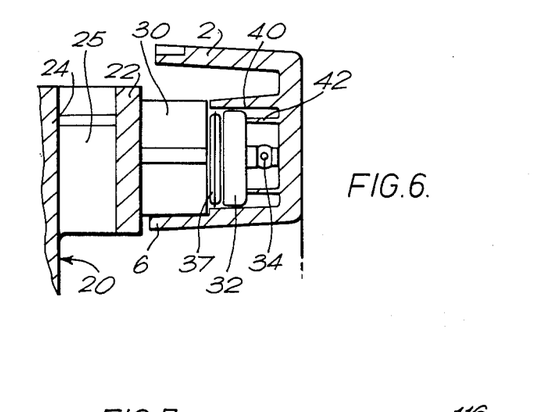
FIG. 6 is a fragmentary sectional view through an actuator included in the brake device of FIGS. 1 and 2.

The brake disc, as shown in FIGS. 3 and 4, comprises spaced front and rear annular walls 22 and 24 having vanes extending inwardly between them to induce a cooling airflow through the brake device 20. The central aperture of the front wall 22 matches that of the sleeve 6 formed in the front housing casting 2, to ensure good air flow. A hub 26 projecting rearwardly from the inner wall 24 is internally splined at 27 for co-operation with splines at an end of the shaft to be braked.

The exposed side of the wall 22 can be frictionally engaged by brake pads 30 mounted by way of actuators 31 in the front casting 2, on operation of the actuators.

As appears from FIG. 2, eight separate brake pads 30 are arranged in the front casting 2 in a ring concentrically around the sleeve 6. The brake device 1 is thus of the spot brake type, and in accordance with the teaching of GB No. 2 100 814 A, a selected number of the brake pads can be mounted in the housing, the number being matched to the work duty of the brake device. Each brake pad mounted by the front casting 2 is directly opposed axially of the shaft and brake disc 20 by a brake pad mounted on the rear casting 4. Although the rear brake pads could be movable by actuators, like the pads 30, they are normally fixed in position in the casting 4.

Each of the brake pads 30 forms, together with the fluid pressure operated actuator 31, a part of a braking assembly which may correspond to the brake pad actuator assembly described in GB No. 2 100 814 A. However, as shown in the present FIG. 6, the assembly can comprise the friction puck or brake pad 30, which is preferably non-circular, for example, rectangular, in cross-section, to provide a larger engagement area than a circular pad, and an actuator 31 of circular cross-section comprising an elastomeric capsule 32, which may be fabric reinforced and which is operated by pressure fluid (oil or compressed air) fed into the capsule by way of a nipple 34. The pressure fluid is supplied to the device 1 by a tube 35 and distribute to the various actuators by a pipe 36 and a distribution manifold clamped inside the casting 2. Between the actuator capsule and the brake pad there is provided an insulation pad 37.

Each actuator 31 is located on the casting 2 by a part-circular integrally formed actuator location web 40 and by an opposed arcuate exterior surface portion 41 of the sleeve 6. Concentrically within the web 40 and the surface portion 41, are provided likewise integrally formed part-circular webs 42 which which afford backing support for the actuator capsule 32.

Also integrally cast into the casting 2 are brake pad guides 44 comprising axially extending walls, of which the side edges are received in grooves formed in the brake pads 30. The brake pads 30 are thus guided for strictly axial movement in dependence on the fluid pressure applied to the capsule 32.

Figure 7:
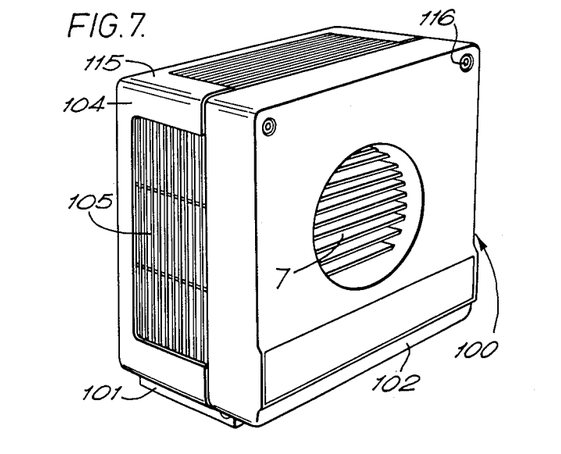
FIGS. 7 and 8 are views similar to those of FIGS. 1 and 2 but of a second illustrative brake device embodying the invention.
Figure 8:
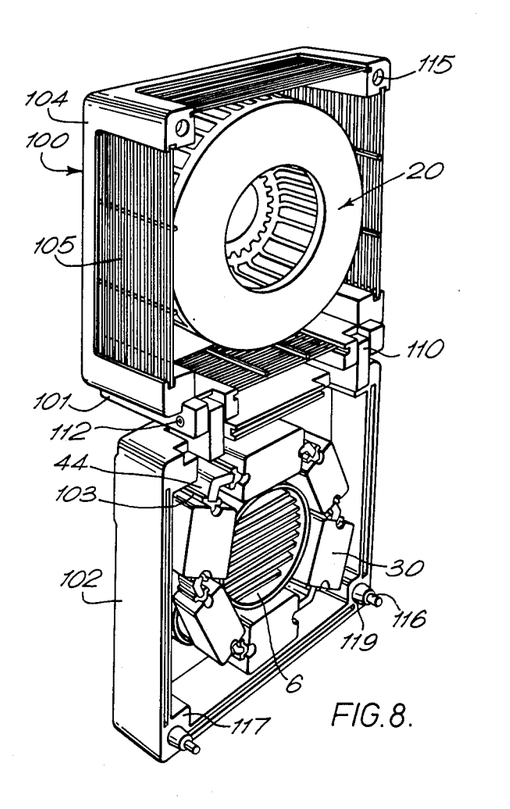

In FIGS. 7 and 8, parts of the second brake device 100 of the invention which correspond to parts of the first brake device 1 are indicated by the reference numerals previously used. Except as noted below, the device 100 corresponds to the device 1.

The brake device 100 again has a housing comprising hingedly connected front and rear castings 102 and 104 functioning similarly to the castings 2 and 4 and of generally similar shape. The sides of the rear casting 102 however have major cut-out portions between corner posts 115 which have channels for slidably receiving welded wire guards 105, which can be readily removed when the housing is open for improved access to the rear casting interior. The guards are retained by further channels in the edges of the sides of the front casting.

Along its lower side, the rear casting 104 has an extension 101 on which the front casting 102 is pivoted. As shown in FIG. 2, the front portion of the extension 101 is formed with upright slots within which are received lugs 110 extending from the front casting. Bolts 112 secured by nuts operate as hinge pins and retain the castings together. The slots and lugs are so arranged that the front casting can pivot downwardly from the fixed rear casting through approximately 180°. Preferably, the hinge pins 112 again can be readily removed, so that the two castings can be completely separated.

The castings 102 and 104 are releasably secured together by clamping bolts 116 received in holes extending through the upper front casing corner posts 117, and through locating cones 119 receivable in recesses in the rear casting corner posts 115.

Around the sleeve the sleeve 6, the front casting 102 mounts six assemblies, each comprising a braking pad 30 and an actuator 31, in the same way as the casting 2. However, to limit wear on the brake pad guides 44 replaceable slide inserts 103, in the form of spring steel strip or of lengths of an extended plastics strip of suitable cross-section, are provided between each edge of the guide and the associated brake pad.

Figure 9:
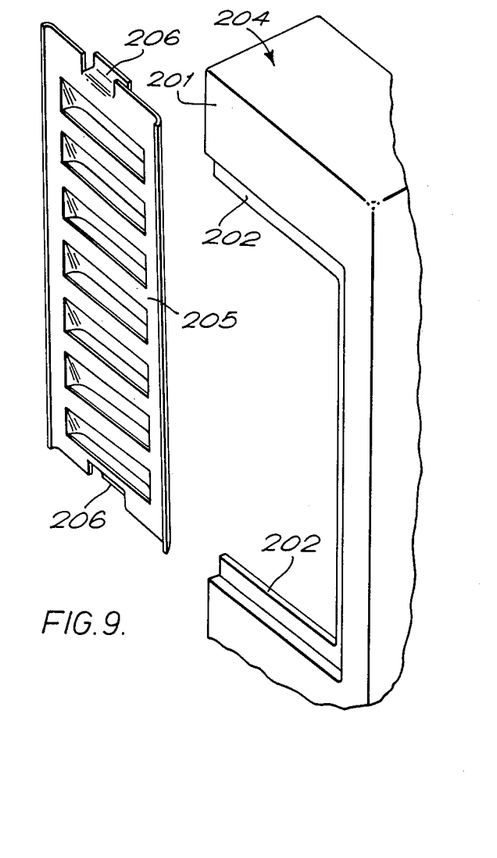
FIGS. 9 and 10 are partial perspective views on a larger scale of the housing of a third illustrative brake device embodying the invention.
Figure 10:
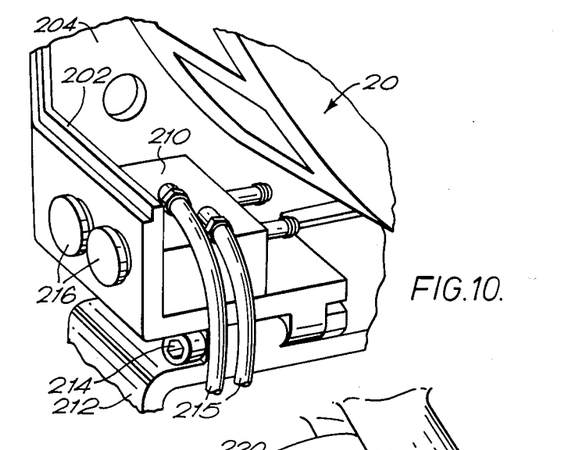
Figure 11:
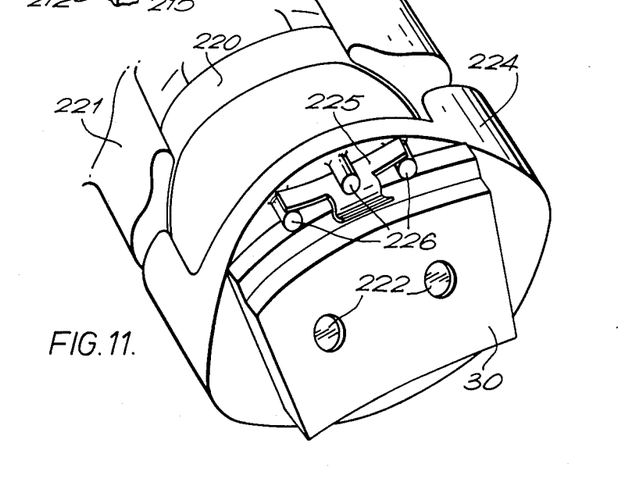
FIG. 11 is fragmentary perspective view of a brake pad and actuator assembly of the brake device of FIGS. 9 and 10.

In FIGS. 9-11, parts of the third brake device according to the invention which correspond to parts of the previously described brake devices are indicated by the reference numerals previously employed. Except as noted below, the third brake device corresponds to the brake devices 1 and 100.

As appears from FIG. 9, the side walls 201 of the rear housing portion 204 are formed with substantially rectangular cut-out portions, edged with integrally cast ridges 202, for reception of an apertured grille 205. The grille 205 is a rectangular metal pressing formed at around the middle of its shorter edges with flap portions or lips 206 turned out at right angles to the plane of the grille and then outwardly parallel to this plane. The ridges 202 are slidably received between this lip 206 and the adjacent edges of the grille. The ridges 202 are readily integrally cast and the grille 205 can be readily replaced after removal for access to the housing interior.

As shown in FIG. 10, at each of the lower corners of the rear housing portion 204 there is integrally cast a selection manifold 210 for control of fluid pressure to actuators 220 mounted on the front housing portion 212 of the third brake device, which is hingedly connected to the housing portion 204 by pivot bolts 214.

Pressure fluid is supplied to each manifold 210 by a fluid pressure line (not shown) for distribution to the actuators 220 on lines 215, the distribution being controlled by longitudinal movement of valve spools 216 received in bores through the manifold 210. An end of each spool 216 is accessible at the housing exterior, as shown.

Each of the actuators 220, as appears from FIG. 11, is arranged to apply a brake or friction pad 30 to the brake disc 20, and is located in the front housing portion 202 by integrally cast projections 221. The brake pad 30 is received on posts 222 in apertures in the pad and forms part of an assembly comprising also a guide ring 224, around and slidable on the projections 221, on which the pad is retained by spring clips 225. Each clip 225 has a generally rectangular base part by which it is held in place between three upstanding locating pins 226, and an extension part curved to provide a rounded surface engaging against a side of the brake pad 30.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim:

1. A brake device for braking a rotatable shaft comprising:
    a brake member carried by said shaft for rotation therewith;
    a plurality of brake assemblies, each brake assembly comprising a brake pad and an actuator for moving said brake pad between inoperative and operative positions, and
    a generally rectangular box-shaped housing receiving said brake member therein, said housing comprising a fixed housing portion and a movable housing portion, mounting means mounting said plurality of brake assemblies on said movable housing portion, and hinge means connecting together said fixed and said movable housing portions for selective movement about a pivot axis located along one edge of said housing between a closed position, in which said plurality of brake assemblies is located for engagement of said brake member by said brake pads in the operative positions thereof, and an open position, in which said plurality of brake assemblies is spaced from said brake member so as to be readily accessible for servicing.

2. The brake device of claim 1 wherein said mounting means are integrally formed with said movable housing portion.

3. The brake device of claim 1 wherein said pivot axis extends transversely to the axis of said rotatable shaft.

4. The brake device of claim 1 wherein said pivot axis is generally horizontal and located beneath the axis of said rotatable shaft.

5. The brake device of claim 1 wherein said movable housing portion has integrally formed guide means for guiding said brake pads between said inoperative and operative positions.

6. The brake device of claim 5 further comprising a replaceable slide insert between each of said integrally formed brake pad means and said brake pad guided thereby.

7. The brake device of claim 5 further comprising at least one aperture in each of said brake pads, and wherein said integrally formed guide means comprises a plurality of guide pins, each guide pin being received in a respective one of said apertures.

8. The brake device of claim 1 further comprising spring clip means for guiding said brake pads and locating means for said spring clip means, said locating means being integrally formed with said movable housing portion.

9. The brake device of claim 1 wherein said housing has a side wall and opposed end walls, one of said end walls being apertured to receive said shaft therethrough, and said side wall and said other end wall being apertured to provide a flow path for cooling air induced by rotation of said brake member.

10. The brake device of claim 1 wherein said brake member is carried at the end region of said shaft for axial sliding movement therealong, and wherein said plurality of brake assemblies is located for said brake pads to act on the side of said brake member remote from said shaft, and further comprising second brake pad means mounted in said housing to be engaged by the other side of said brake member.

11. The brake device of claim 10 wherein said brake member is slidably removable from said shaft in the open position of said housing to provide access to said second brake pad means.

12. A brake device for braking a rotatable shaft comprising:
    a brake member carried by said shaft for rotation therewith;
    a plurality of brake assemblies, each brake assembly comprising a brake pad and an actuator for moving said brake pad between inoperative and operative positions,
    a housing receiving said brake member therein, said housing comprising a fixed housing portion and a movable housing portion, mounting means mounting said plurality of brake assemblies on said movable housing portion, and hinge means connecting together said fixed and said movable housing portions for selective movement about a pivot axis between a closed position, in which said plurality of brake assemblies is located for engagement of said brake member by said brake pads in the operative positions thereof, and an open position, in which said plurality of brake assemblies is spaced from said brake member so as to be readily accessible for servicing,
    guide means integrally formed with said movable housing portion for guiding said brake pads between said inoperative and operative positions, and
    a replaceable slide insert between each of said integrally formed brake pad guide means and said brake pad guided thereby.

13. A brake device for braking a rotatable shaft comprising:
    a brake member carried by said shaft for rotation therewith;
    a plurality of brake assemblies, each brake assembly comprising a brake pad and an actuator for moving said brake pad between inoperative and operative positions, a housing receiving said brake member therein, said housing comprising a fixed housing portion and a movable housing portion, mounting means mounting said plurality of brake assemblies on said movable housing portion, and hinge means connecting together said fixed and said movable housing portions for selective movement about a pivot axis between a closed position, in which said plurality of brake assemblies is located for engagement of said brake member by said brake pads in the operative positions thereof, and an open position, in which said plurality of brake assemblies is spaced from said brake member so as to be readily accessible for servicing, guide means integrally formed with said movable housing portion for guiding said brake pads between said inoperative and operative positions, said guide means comprising a plurality of guide pins, and at least one aperture in each of said brake pads, each of said guide pins being received in a respective one of said apertures.

14. A brake device for braking rotation of a shaft comprising:

a brake disc carried by said shaft for rotation therewith;

a plurality of brake assemblies, each brake assembly comprising a brake pad and a fluid pressure operated actuator for moving said brake pad from an inoperative to an operative position, a housing receiving said brake disc therein, said housing comprising a fixed housing portion and a movable housing portion, and hinge means pivotally connecting together said fixed and said movable housing portions for selective movement between closed and open positions, means mounting said plurality of brake assemblies on said movable housing portion whereby in the closed position of said housing said brake disc is engaged by said brake pads in the operative positions thereof, and in the open position of said housing said plurality of brake assemblies is spaced from said brake disc so as to be readily accessible for servicing, said housing having a side wall and opposed end walls, one of said end walls being apertured to receive said shaft therethrough, and said side wall and said other end wall being apertured to provide a flow path for cooling air induced by rotation of said brake disc.

15. A brake device for braking rotation of a rotatable shaft, said brake device comprising:

a brake element carried by said shaft for rotation therewith, a housing, said housing having a first end wall apertured to receive said shaft therethrough with said brake element within said housing, a second end wall opposed to said first end wall and having a central aperture, and apertured side wall means between said first and second end walls, a plurality of brake assemblies, each assembly comprising a brake pad and an actuator for selectively moving said brake pad to frictionally engage said brake element, mounting means mounting said actuators on said second end wall so as to be located around said central aperture thereof, pivot means whereby said second end wall can be pivoted about a pivot axis spaced from and transverse to the axis of said shaft to allow access to said brake assemblies for servicing, said brake element being adapted to induce a cooling air flow through said apertured side wall means and said second end wall central aperture.

16. The brake device of claim 15 wherein said second end wall is a casting having integrally formed means for guiding said brake pads.

17. A brake device for braking rotation of a rotatable shaft, said brake device comprising:

a brake element carried by said shaft for rotation therewith, a rectangular housing, said housing having a first end wall apertured to receiving said shaft therethrough with said brake element within said housing, and a second end wall opposed to said first end wall, a plurality of brake assemblies, each assembly comprising a brake pad and an actuator for selectively moving said brake pad to frictionally engage said brake element, and mounting means mounting said actuators on said second end wall, and pivot means whereby said second end wall can be pivoted about a pivot axis to allow access to said brake assemblies for servicing, said pivot axis being spaced from and transverse to the axis of said shaft, and extending along a lower generally horizontal edge of said housing.

18. The brake device of claim 17 wherein said housing further comprises apertured side wall means between said first and second end walls, said second end wall has a central aperture, said brake assemblies are located around said central aperture, and wherein said brake element is adapted to induce a cooling air flow through said apertured side wall means and second end wall.

* * * * *